US012119150B2

(12) United States Patent
Sung et al.

(10) Patent No.: US 12,119,150 B2
(45) Date of Patent: Oct. 15, 2024

(54) METHOD FOR PRODUCING SINTERED MAGNET AND SINTERED MAGNET

(71) Applicant: LG Chem, Ltd., Seoul (KR)

(72) Inventors: Nakheon Sung, Daejeon (KR); Ingyu Kim, Daejeon (KR); Soon Jae Kwon, Daejeon (KR); Jinhyeok Choe, Daejeon (KR); Hyounsoo Uh, Daejeon (KR); Tae Hoon Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 645 days.

(21) Appl. No.: 17/288,661

(22) PCT Filed: Sep. 24, 2020

(86) PCT No.: PCT/KR2020/012913
§ 371 (c)(1),
(2) Date: Apr. 26, 2021

(87) PCT Pub. No.: WO2021/060849
PCT Pub. Date: Apr. 1, 2021

(65) Prior Publication Data

US 2021/0398718 A1 Dec. 23, 2021

(30) Foreign Application Priority Data

Sep. 26, 2019 (KR) ........................ 10-2019-0118839
Sep. 23, 2020 (KR) ........................ 10-2020-0122724

(51) Int. Cl.
*H01F 1/057* (2006.01)
*B22F 1/148* (2022.01)
(Continued)

(52) U.S. Cl.
CPC ............ *H01F 1/0577* (2013.01); *B22F 1/148* (2022.01); *B22F 3/1003* (2013.01); *B22F 3/24* (2013.01);
(Continued)

(58) Field of Classification Search
CPC ............ B22F 2301/052; B22F 2301/10; H01F 41/0253; H01F 41/0266; H01F 1/0536;
(Continued)

(56) References Cited

U.S. PATENT DOCUMENTS 5,482,575 A * 1/1996 Barzasi ................ H01F 1/0573 75/244
10,385,442 B2 8/2019 Zhou et al.
(Continued)

FOREIGN PATENT DOCUMENTS

CN 1407121 A 4/2003
CN 102881395 A 1/2013
(Continued)

OTHER PUBLICATIONS

Search Report for European Application No. 20867972.0 dated Dec. 3, 2021. 1 pg.
(Continued)

*Primary Examiner* — Vanessa T. Luk
(74) *Attorney, Agent, or Firm* — Lerner David LLP

(57) ABSTRACT

A sintered magnet and a method for producing the same are provided. The method includes producing an R—Fe—B-based magnet powder by a reduction-diffusion method, adding a R—Al—Cu powder as a sintering agent to the R—Fe—B-based magnet powder to form a mixed powder, wherein the R—Al—Cu powder is an alloy of R, Al and Cu, and R is Nd, Pr, Dy, Tb or Ce, and sintering the mixed powder to form a sintered magnet.

8 Claims, 6 Drawing Sheets

(51) Int. Cl.

| | |
|---|---|
| ***B22F 3/10*** | (2006.01) |
| ***B22F 3/24*** | (2006.01) |
| ***C22C 38/00*** | (2006.01) |
| ***C22C 38/06*** | (2006.01) |
| ***C22C 38/16*** | (2006.01) |
| ***H01F 41/02*** | (2006.01) |
| *B22F 9/20* | (2006.01) |

(52) U.S. Cl.
CPC .......... *C22C 38/002* (2013.01); *C22C 38/005* (2013.01); *C22C 38/06* (2013.01); *C22C 38/16* (2013.01); *H01F 41/0266* (2013.01); *B22F 2003/248* (2013.01); *B22F 9/20* (2013.01); *B22F 2201/11* (2013.01); *B22F 2301/355* (2013.01); *C22C 2202/02* (2013.01)

(58) Field of Classification Search
CPC .......... H01F 1/08; H01F 1/086; H01F 1/0575; H01F 1/0576; H01F 1/0577
See application file for complete search history.

(56) References Cited

U.S. PATENT DOCUMENTS

| | | | | |
|---|---|---|---|---|
| 2006/0000522 | A1 | 1/2006 | Hirota et al. | |
| 2012/0299675 | A1 | 11/2012 | Honkura et al. | |
| 2014/0184370 | A1 | 7/2014 | Hidaka et al. | |
| 2016/0203892 | A1 | 7/2016 | Lee et al. | |
| 2018/0182518 | A1 * | 6/2018 | Satoh | B22F 3/16 |
| 2019/0292635 | A1 * | 9/2019 | In | B22F 1/06 |
| 2020/0096892 | A1 | 3/2020 | Kano et al. | |
| 2020/0203068 | A1 | 6/2020 | Choi et al. | |

FOREIGN PATENT DOCUMENTS

| | | | | | |
|---|---|---|---|---|---|
| CN | 105788839 | A | | 7/2016 | |
| CN | 106710768 | A | * | 5/2017 | |
| CN | 109509628 | A | | 3/2019 | |
| CN | 110021466 | A | | 7/2019 | |
| EP | 2511920 | A1 | | 10/2012 | |
| EP | 3605570 | A1 | | 2/2020 | |
| JP | H104221805 | A | | 8/1992 | |
| JP | H04293708 | A | | 10/1992 | |
| JP | H05013207 | A | | 1/1993 | |
| JP | H09275004 | A | | 10/1997 | |
| JP | 2005179761 | A | | 7/2005 | |
| JP | 2014017480 | A | | 1/2014 | |
| JP | 2018026390 | A | | 2/2018 | |
| JP | 2018186200 | A | | 11/2018 | |
| JP | 202052131 | A | | 4/2020 | |
| KR | 20150033528 | A | | 4/2015 | |
| KR | 101913137 | B1 | | 10/2018 | |
| KR | 101918975 | B1 | | 11/2018 | |
| KR | 20190062187 | A | | 6/2019 | |
| KR | 20190085442 | A | | 7/2019 | |
| WO | 2011070827 | A1 | | 6/2011 | |
| WO | WO-2018088709 | A1 | * | 5/2018 | B22F 1/0007 |
| WO | 2019107929 | A1 | | 6/2019 | |

OTHER PUBLICATIONS

International Search Report for Application No. PCT/KR2020/012913 dated Dec. 30, 2020, pp. 1-3.

Zeng, Huixin et al., "Significantly enhancing the coercivity of NdFeB magnets by ternary Pr—Al—Cu alloys diffusion and understanding the elements diffusion behavior", Journal of Magnetism and Magnetic Materials, Available online Sep. 2018, pp. 97-104, vol. 471, Elsevier.

Search Report dated Jun. 29, 2022 from the Office Action for Chinese Application No. 202080006088.1 issued Jul. 5, 2022, pp. 1-3.

* cited by examiner

METHOD FOR PRODUCING SINTERED MAGNET AND SINTERED MAGNET

CROSS-REFERENCE TO RELATED APPLICATION(S)

This application is a national phase entry under 35 U.S.C. § 371 of International Application No. PCT/KR2020/012913 filed Sep. 24, 2020, which claims priority from Korean Patent Application No. 10-2019-0118839 filed on Sep. 26, 2019 and Korean Patent Application No. 10-2020-0122724 filed on Sep. 23, 2020 in the Korean Intellectual Property Office, each of which are incorporated herein by reference in their entirety.

TECHNICAL FIELD

The present disclosure relates to a method for producing a sintered magnet and a sintered magnet produced thereby. More specifically, it relates to a method for producing a sintered magnet that improves magnetic properties using a sintering agent, and a sintered magnet produced by this method.

BACKGROUND ART

NdFeB-based magnets are permanent magnets having a composition of $Nd_2Fe_{14}B$ which is a compound of neodymium (Nd), a rare earth element, and iron and boron (B), and have been used as general-purpose permanent magnets for 30 years since there were developed in 1983. The NdFeB-based magnets are used in various fields such as electronic information, automobile industry, medical equipment, energy, and transportation. In particular, in line with recent trends in weight reduction and miniaturization, they are used in products such as machine tools, electronic information devices, electronic products for home appliances, mobile phones, robot motors, wind power generators, small motors for automobiles, and driving motors.

For the general production of NdFeB-based magnets, a strip/mold casting or melt spinning method based on a metal powder metallurgy method is known. First, the strip/mold casting method is a process in which metals such as neodymium (Nd), iron (Fe), boron (B) are melted by heating to produce an ingot, crystal grain particles are coarsely pulverized and subjected to a miniaturization process to produce microparticles. These steps are repeated to obtain a magnet powder, which is subjected to a pressing and sintering process under a magnetic field to produce an anisotropic sintered magnet.

In addition, the melt spinning method is a process in which metal elements are melted, then poured into a wheel rotating at a high speed, rapidly cooled, pulverized by a jet mill, then blended with a polymer to form a bonded magnet, or pressed to produce a magnet.

However, all of these methods have problems that a pulverization process is essentially needed, it takes a long time in the pulverization process, and a process of coating the surface of the powder after pulverization is needed. Further, since the existing $Nd_2Fe_{14}B$ microparticles are produced by a process in which the raw material (1500-2000° C.) is melted and quenched, and the obtained lump is subjected to coarse pulverization, and hydrogen crushing/jet mill multi-step treatment, the particle shape is irregular and there is a limit to the miniaturization of particles.

Recently, attention has been paid to the method of producing a magnet powder by a reduction-diffusion process.

For example, uniform NdFeB fine particles can be produced through a reduction-diffusion process in which $Nd_2O_3$, Fe, and B are mixed and reduced with Ca or the like. However, an oxide film may be formed in the process of removing a reducing agent such as Ca and a reduced by-product used at the time of reduction in this method. The oxide film makes it difficult to sinter the magnetic powder, and the high oxygen content promotes the decomposition of columnar magnetic particles, and the properties of the sintered magnet obtained by sintering the magnetic powder may be deteriorated.

DETAILED DESCRIPTION OF THE INVENTION

Technical Problem

Embodiments of the present disclosure has been designed to solve the above-mentioned problems, and an object of the present disclosure is to provide a method for producing a sintered magnet that improves the properties of a sintered magnet by adjusting the phase distributed in the grain boundary during sintering of magnetic powder, and a sintered magnet produced by this method.

However, the problem to be solved by embodiments of the present disclosure is not limited to the above-described problems, and can be variously expanded within the scope of the technical idea included in the present disclosure.

Technical Solution

A method for producing a sintered magnet according to an embodiment of the present disclosure includes the steps of: producing an R—Fe—B-based magnet powder by a reduction-diffusion method, adding a R—Al—Cu powder as a sintering agent to the R—Fe—B-based magnet powder to form a mixed powder, and sintering the mixed powder to form a sintered magnet, wherein the R—Al—Cu powder is an alloy of R, Al and Cu, and the R is Nd, Pr, Dy, Tb or Ce.

The method for producing a sintered magnet may further include a step of forming a R—Al—Cu powder as the sintering agent, wherein the step of forming the R—Al—Cu powder may include the steps of: mixing $RH_2$ powder, Al powder, and Cu powder to form a sintered precursor, agglomerating the sintered precursor, raising the temperature of the agglomerated sintered precursor to form a metal alloy, and pulverizing the metal alloy to form the sintering agent.

The method for producing a sintered magnet may further include the step of wrapping the sintered precursor in a metal foil when raising the temperature of the agglomerated sintered precursor.

The step of forming the sintered precursor may further include a step of mixing a liquid Ga.

The metal foil may be Mo or Ta.

When wrapping the agglomerated sintered precursor in the metal foil and raising the temperature, the temperature may be raised in an argon gas atmosphere.

The step of forming the metal alloy may further include the step of wrapping the agglomerated sintered precursor in the metal foil, raising the temperature up to 900 degrees Celsius to 1050 degrees Celsius, and then performing an additional heat treatment.

The step of agglomerating the sintered precursor may use any one of hydraulic pressing, tapping, and cold isostatic pressing (CIP).

The method for producing a sintered magnet may further include a step of adding $NdH_2$ powder to the R—Al—Cu powder as the sintering agent.

A sintered magnet according to another embodiment of the present disclosure is produced by the above-mentioned production method.

Advantageous Effects

According to the embodiments, in order to prevent the properties of the sintered magnet from being deteriorated by the oxide film generated when producing the magnetic powder as in the prior art, the powder of the metal alloy can be used as a sintering agent, thereby preventing the deterioration of the properties of the sintered magnet properties while lowering the melting temperature

DETAILED DESCRIPTION OF THE EMBODIMENTS

Figure 1:
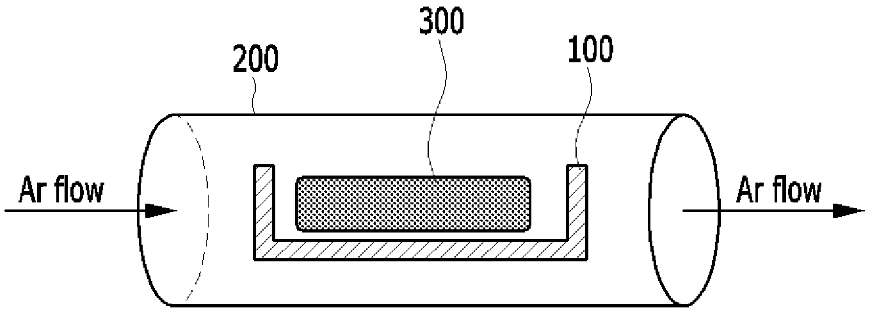
FIG. 1 is a view showing a step of producing an R—Al—Cu metal alloy powder in a method of producing a sintered magnet according to an embodiment of the present disclosure.

Hereinafter, various embodiments of the present disclosure will be described in detail so that those skilled in the art can easily implement them. The present disclosure may be modified in various different ways, and is not limited to the embodiments set forth herein.

Further, throughout the specification, when a portion is referred to as "including" a certain component, it means that it can further include other components, without excluding the other components, unless otherwise stated.

According to the present embodiment, a magnetic powder can be produced through a reduction-diffusion process using a low-cost rare earth oxide. An oxide film can be formed in the process of removing a reducing agent such as Ca and a reduced by-product used at the time of reduction by such a method. Such an oxide film makes it difficult to sinter the magnetic powder and may impair the properties of the sintered magnet. In order to supplement this, the present embodiment uses the powder of the metal alloy as a sintering agent, thereby being able to prevent the deterioration of the properties of the sintered magnet while lowering the melting temperature.

When the oxygen content inside the magnet powder during sintering is increased, the magnetic properties are deteriorated, so it is necessary to use a high-purity metal alloy. However, in order to produce such an alloy, it is usually required to subject metal masses to arc melting or induction melting to melt it at high temperature. For example, in the case of the arc melting method, a process in which metal lumps are melted together in a vacuum atmosphere at about 2000 degrees Celsius to 3000 degrees Celsius by the generation of an arc through high pressure and high current, and the molten metal lumps are turned over and re-melted can be repeated. However, due to a space restriction on the arc melting machine, and a restriction on the maximum amount of sample for uniform melting, it can be produced only in small quantities. In addition, it is difficult to accurately control temperature during the arc melting process, and in the case of aluminum, it is vaporized in the process of melting due to the vapor pressure in a vacuum and causes a loss, thereby making it difficult to add an accurate ratio.

On the other hand, according to the present embodiment, when the melting temperature is lowered during production of a metal alloy used as a sintering agent, the cost can be reduced. Specifically, according to the present embodiment, since the sintering agent is produced below 1050 degrees Celsius by using $RH_2$ powder and respective metal powders, the economic efficiency can be improved at the process stage. Further, in the case of a metal material such as Ga that is liquid at room temperature, if arc melting is used, it is scattered during arc formation, which is technically difficult to make an alloy, whereas according to the present embodiment, it is possible to add an exact ratio.

In the present embodiment, the metal alloy as a sintering agent corresponds to 1) a case in which 1) each metal powder corresponding to each element constituting the alloy is included as a sintering agent, or 2) a case in which a material corresponding to each element constituting the alloy is prepared as a precursor before sintering and metal alloy powder is included as a sintering agent.

FIG. 1 is a view showing a step of producing an R—Al—Cu metal alloy powder in a method of producing a sintered magnet according to an embodiment of the present disclosure.

According to one embodiment of the present disclosure corresponding to the above case 2), it includes a step of adding a R—Al—Cu metal alloy powder as a sintering agent to the R—Fe—B-based magnet powder to form a mixed powder. Specifically, the step of forming the R—Al—Cu powder includes the steps of: mixing $RH_2$ powder, Al powder, and Cu powder to form a sintered precursor, agglomerating the sintered precursor, wrapping the agglomerated sintered precursor in a metal foil and raising the temperature to form a metal alloy, and pulverizing the metal alloy to form the sintering agent. The step of forming the sintered precursor may further include a step of mixing a liquid Ga. Further, the metal foil may include Mo or Ta.

Referring to FIG. 1, a sintered precursor in which $RH_2$ powder, Al powder, and Cu powder are mixed may be compressed by cold isostatic pressing (CIP) or the like, and the lump may be wrapped in a metal foil of Mo or Ta. The lump 300 wrapped in metal foil is put in an alumina crucible 100 and heated in a tube furnace 200 under an argon (Ar) atmosphere to about 1050 degrees Celsius, thereby obtaining a high-purity alloy. At this time, the tube furnace 200 may be formed of a material such as alumina or SUS (stainless steel).

According to the present embodiment, it is advantageous to produce a large amount of metal alloys without space restrictions, and materials that are easily vaporized such as aluminum are also vaporized at high temperatures to minimize the lost part, so that an accurate addition ratio can be adjusted in the process progress. Further, since an electric furnace such as a tube furnace that can accurately control temperature and control a gas atmosphere during the process is used, a relatively low-cost device can be used. Further, not only elements such as aluminum that evaporate well, but also metal materials such as Ga that are liquid at room temperature, can be added at an accurate ratio. In addition, it is not necessary to use a vacuum state, and a metal alloy can be produced simply under normal pressure.

When wrapping the agglomerated sintered precursor in the metal foil and raising the temperature, the temperature may be raised in an argon gas atmosphere.

The forming of the metal alloy may further include the step of wrapping the agglomerated sintered precursor in the metal foil, raising the temperature up to 900 degrees Celsius to 1050 degrees Celsius, and then performing additional heat treatment. Here, the additional heat treatment is a heat treatment of the already synthesized alloy at a relatively low temperature, and a more uniform phase can be obtained through such annealing.

The step of agglomerating the sintered precursor may be performed using any one pressing method of hydraulic pressing, tapping and cold isostatic pressing (CIP).

The step of adding $NdH_2$ powder to the R—Al—Cu powder as the sintering agent may be further included. Since it is not possible to sinter the magnet powder itself, the $NdH_2$ powder contained in the sintering agent makes it possible to sinter a magnetic powder by mixing with a small amount of $NdH_2$ powder.

Since the composition of $Ra_{0.7}Al_{0.2}Cu_{0.1}$ generally has the lowest melting point when R (rare earth) and Cu are mixed in a ratio of approximately 7:3, it is preferable to set R to 0.7. According to the present embodiment, from the composition of 100% of Al and 0% of Cu to the composition of 50% of Al and 50% of Cu, they are melted together at less than 800 degrees Celsius to form an alloy, wherein Al can be prepared with a composition larger than that of Cu. If a large amount of Al and Cu are added as a sintering agent, the magnetic flux density may be lowered. Therefore, at the time of sintering, 0.17 wt % of Al and 0.2 wt % of Cu are added, and $NdH_2$ is further added to set the reference value, followed by sintering.

Hereinafter, the method of producing a sintered magnet according to one embodiment of the present disclosure will be described in more detail. However, the following examples correspond to examples for explaining the present disclosure, and the scope of the present disclosure are not limited thereto.

Comparative Example 1

A magnetic powder synthesized with the composition of $Nd_{2.4}Fe_{12.8}BCu_{0.05}$ and a sintering agent were mixed in a mortar, and the mixture was placed in a molybdenum (Mo) crucible or a carbon (C) crucible as a mold for obtaining a magnet of a desired shape. Thereafter, the temperature was raised to 850 degrees Celsius at a temperature rising rate of 300 degrees Celsius/hour in an ultra-high vacuum state of approximately $10^{-6}$ torr or less, and then maintained for about 30 minutes. The temperature was raised again to 1070 degrees Celsius at the same temperature rising rate, maintained for two hours, and then naturally cooled to room temperature to obtain a sintered body (material after sintering). In the process of sintering, 6 wt % of $NdH_2$ was added as a sintering agent. All operation was carried out in an argon (Ar) atmosphere.

Example 1

Sintering was performed under approximately the same conditions as in Comparative Example 1, but in the process of sintering, 6 wt % of $NdH_2$ powder, 0.17 wt % of Al powder, and 0.2 wt % of Cu powder were added as a sintering agent.

Example 2

Sintering was performed under approximately the same conditions as in Comparative Example 1, but in the process of sintering, a metal alloy powder of $NdH_2$ and $Nd_{0.7}Al_{0.2}Cu_{0.1}$ was added as a sintering agent so that the amount was identical to that of Example 1. In other words, when sintering the mixture of the magnet powder and the sintering agent in Examples 1 and 2, the atomic weight ratio of each added metal element can be identical relative to the mass of the magnet powder.

In order to prepare a metal alloy powder of $NdH_2$ and $Nd_{0.7}Al_{0.2}Cu_{0.1}$, the method for producing a sintering agent as follows was used. $NdH_2$ powder, Al powder, and Cu powder were mixed, and the mixture was agglomerated by cold isostatic pressing (CIP). Thereafter, the agglomerated mixture was wrapped in Mo metal foil or Ta metal foil, and heated to 300 degrees Celsius per hour in an argon (Ar) gas atmosphere, and further heated at 900 degrees Celsius to 1050 degrees Celsius for an additional hour. The prepared metal alloy was pulverized to obtain a powder form.

Comparative Example 2

Sintering was performed under approximately the same conditions as in Comparative Example 1, but the magnetic powder synthesized with the composition of $Nd_{2.4}Fe_{12}Co_{0.8}BCu_{0.05}$ was used instead of the magnetic powder synthesized with the composition of $Nd_{2.4}Fe_{12.8}BCu_{0.05}$. In addition, 10 wt % of $NdH_2$ was added as a sintering agent.

Example 3

Sintering was performed under approximately the same conditions as in Comparative Example 2, but in the process of sintering, 10 wt % of $NdH_2$ powder, 0.17 wt % of Al powder, and 0.2 wt % of Cu powder were added as a sintering agent.

Example 4

Sintering was performed under approximately the same conditions as in Example 3, but in the process of sintering, a metal alloy powder of $NdH_2$ and $Nd_{0.7}Al_{0.2}Cu_{0.1}$ was added as a sintering agent so that the amount was identical to that of Example 3. In order to prepare a metal alloy powder of $NdH_2$ and $Nd_{0.7}Al_{0.2}Cu_{0.1}$, the method for producing a sintering agent as follows was used. $NdH_2$ powder, Al powder, and Cu powder were mixed, and the mixture was agglomerated by cold isostatic pressing (CIP). Thereafter, the agglomerated mixture was wrapped in Mo metal foil or Ta metal foil, and heated to 300 degrees Celsius per hour in an argon (Ar) gas atmosphere, and further heated at 900 degrees Celsius to 1050 degrees Celsius for an additional hour. The prepared metal alloy was pulverized to obtain a powder form.

Example 5

Sintering was performed under approximately the same conditions as in Example 4, but an alloy powder of $NdH_2$ and $Dy_{0.7}Al_{0.2}Cu_{0.1}$ was used as a sintering agent instead of the alloy powder of $NdH_2$ and $Nd_{0.7}Al_{0.2}Cu_{0.1}$.

Example 6

Sintering was performed under approximately the same conditions as in Example 4, but an alloy powder of $NdH_2$ and $Pr_{0.7}Al_{0.2}Cu_{0.1}$ was used as a sintering agent instead of the alloy powder of $NdH_2$ and $Nd_{0.7}Al_{0.2}Cu_{0.1}$.

Figure 2:
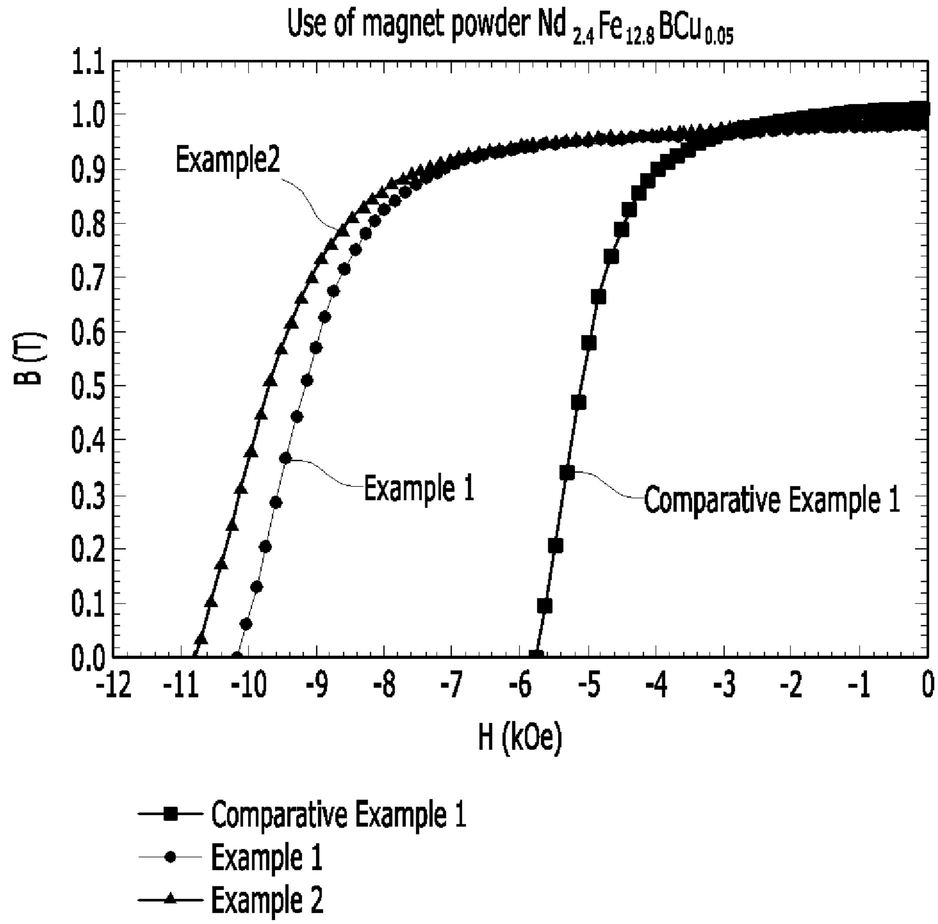
FIG. 2 is a BH graph showing the magnetic flux density (Y-axis) according to the coercive force (X-axis) measured in a sintered magnet produced according to Comparative Examples and Examples of the present disclosure.

FIG. 2 is a BH graph showing the magnetic flux density (Y-axis) according to the coercive force (X-axis) measured in a sintered magnet prepared according to Comparative Examples and Examples of the present disclosure.

FIG. 2 shows the magnetic flux density (Y-axis) according to the coercive force (X-axis) measured in Comparative Example 1, Example 1, and Example 2, respectively. Referring to FIG. 2, it can be confirmed that the properties of the sintered magnet are improved in Examples 1 and 2 compared to Comparative Example 1. Further, the case of sintering using the powder of a metal alloy as a sintering agent (Example 2) has improved properties of the sintered magnet as compared with the case of mixing and sintering the powder of a material corresponding to each sintering component element (Example 1).

When the amount of increase in the coercive force of Example 2 is converted into a percentage as compared with Example 1, an improvement of about 10 to 20% can be confirmed. That is, it is possible to obtain a meaningful increase in the coercive force according to the change in the shape of the sintering agent.

Figure 3:
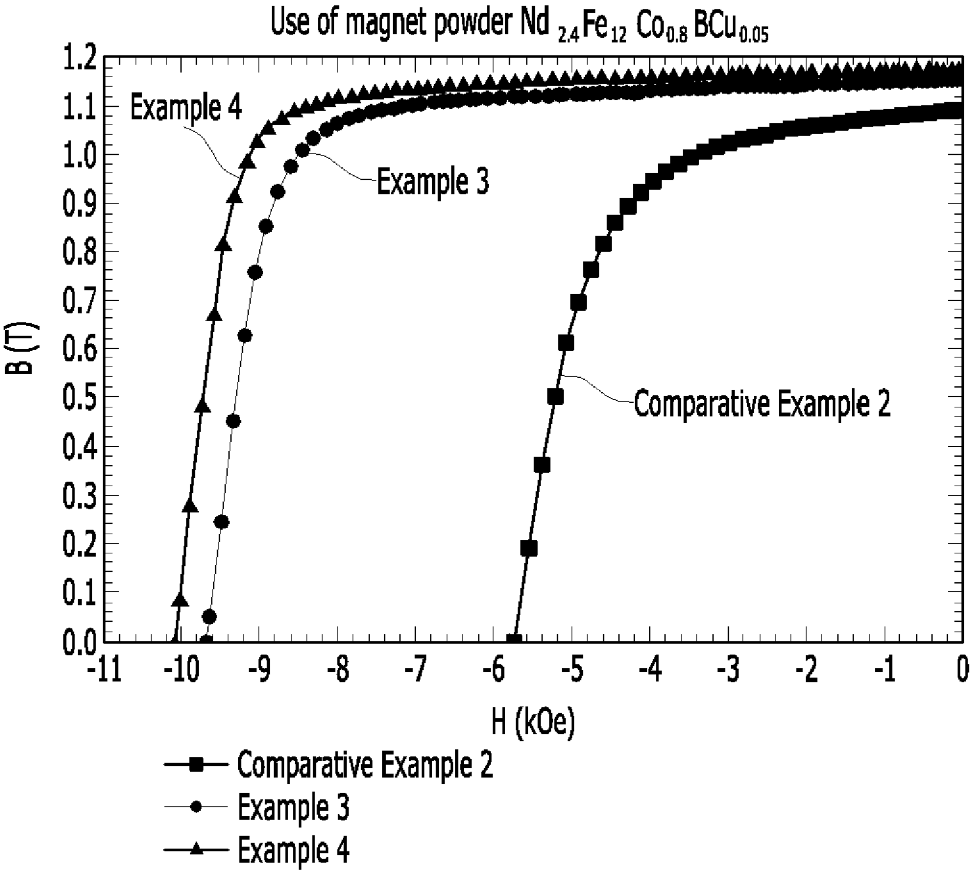
FIG. 3 is a BH graph showing the magnetic flux density (Y-axis) according to the coercive force (X-axis) measured in the sintered magnet produced according to Comparative Examples and Examples of the present disclosure, when changing the composition of the magnetic powder before sintering of FIG. 2.

FIG. 3 is a BH graph showing the magnetic flux density (Y-axis) according to the coercive force (X-axis) measured in the sintered magnet produced according to Comparative Examples and Examples of the present disclosure, when changing the composition of the magnetic powder before sintering of FIG. 2.

FIG. 3 shows the magnetic flux density (Y-axis) according to the coercive force (X-axis) measured in Comparative Example 2, Example 3, and Example 4, respectively. Referring to FIG. 3, it can be confirmed that the properties of the sintered magnet are improved in Examples 3 and 4 compared to Comparative Example 2. Further, the case of sintering using the powder of a metal alloy as a sintering agent (Example 4) has improved properties of the sintered magnet as compared with the case of mixing and sintering the powder of a material corresponding to each sintering component element (Example 3).

Figure 4:
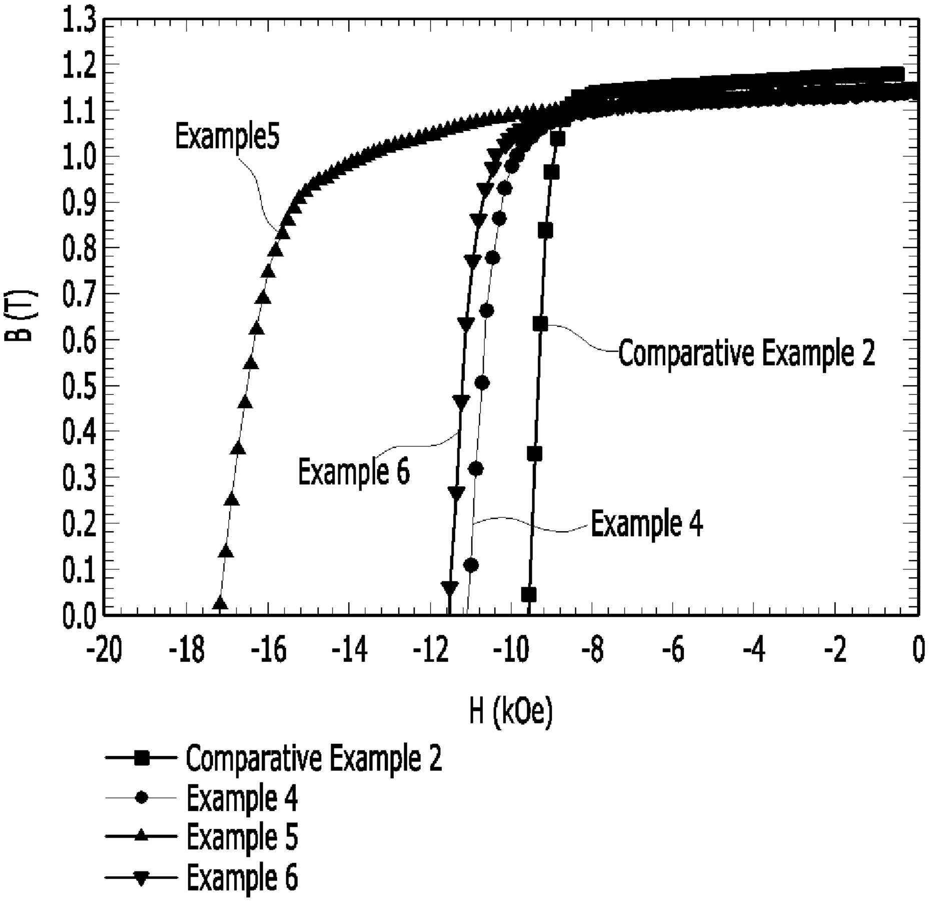
FIG. 4 is a BH graph showing the magnetic flux density (Y-axis) according to the coercive force (X-axis) measured in a sintered magnet produced by changing the type of rare earth metal contained in the metal alloy, when using the powder of a metal alloy according to an embodiment of the present disclosure as a sintering agent.

FIG. 4 is a BH graph showing the magnetic flux density (Y-axis) according to the coercive force (X-axis) measured in a sintered magnet produced by changing the type of rare earth metal contained in the metal alloy, when using the powder of a metal alloy according to an embodiment of the present disclosure as a sintering agent.

FIG. 4 shows the magnetic flux density (Y axis) according to the coercive force (X axis) measured in Comparative Example 2, Example 4, Example 5, and Example 6, respectively. Referring to FIG. 4, it can be confirmed that the properties of the sintered magnet are improved in Examples 4, 5 and 6 compared to Comparative Example 2. Further, when sintering using the powder of the metal alloy as a sintering agent, it can be confirmed that the properties of the sintered magnet are improved even if the type of rare earth metal contained in the metal alloy is changed. In particular, it can be confirmed that the properties of the sintered magnet are most improved when it is Dy among the rare earth metals included in the metal alloy. In addition, in the present embodiment, a sintering agent of a three-phase metal alloy, that is, R—Al—Cu (where R is Nd, Pr, Dy, Tb, or Ce) metal alloy, has been described, but a quaternary metal alloy with the addition of other metals such as Ga is also applicable as a modified example.

Hereinafter, a case where a quaternary metal alloy is formed in the method of producing a sintered magnet according to one embodiment of the present disclosure will be described. However, the following examples correspond to examples for explaining the present disclosure, and the scope of the present disclosure are not limited thereto.

Example 7

A sintered magnet was formed by sintering under approximately the same conditions as in Comparative Example 1, and then a metal alloy powder of $Pr_{0.7}Al_{0.2}Cu_{0.1}Ga_{0.1}$ was used as an auxiliary agent for infiltration.

In order to prepare the metal alloy powder of $Pr_{0.7}Al_{0.2}Cu_{0.1}Ga_{0.1}$, the method for producing a sintering agent as follows was used. Pr powder, Al powder, Cu powder, and liquid Ga were mixed, and the mixture was agglomerated by a cold isostatic pressing (CIP). Then, the agglomerated mixture was wrapped in Mo metal foil or Ta metal foil, and heated to 300 degrees Celsius per hour in an argon (Ar) gas atmosphere, and further heated at 900 degrees Celsius to 1050 degrees Celsius for an additional hour. The prepared metal alloy was pulverized to obtain a powder form.

Example 8

Sintering was performed under approximately the same conditions as in Example 7, but an alloy powder of $Dy_{0.7}Al_{0.2}Cu_{0.1}Ga_{0.1}$ was used as an auxiliary agent for infiltration instead of the alloy powder of $Pr_{0.7}Al_{0.2}Cu_{0.1}Ga_{0.1}$.

Figure 5:
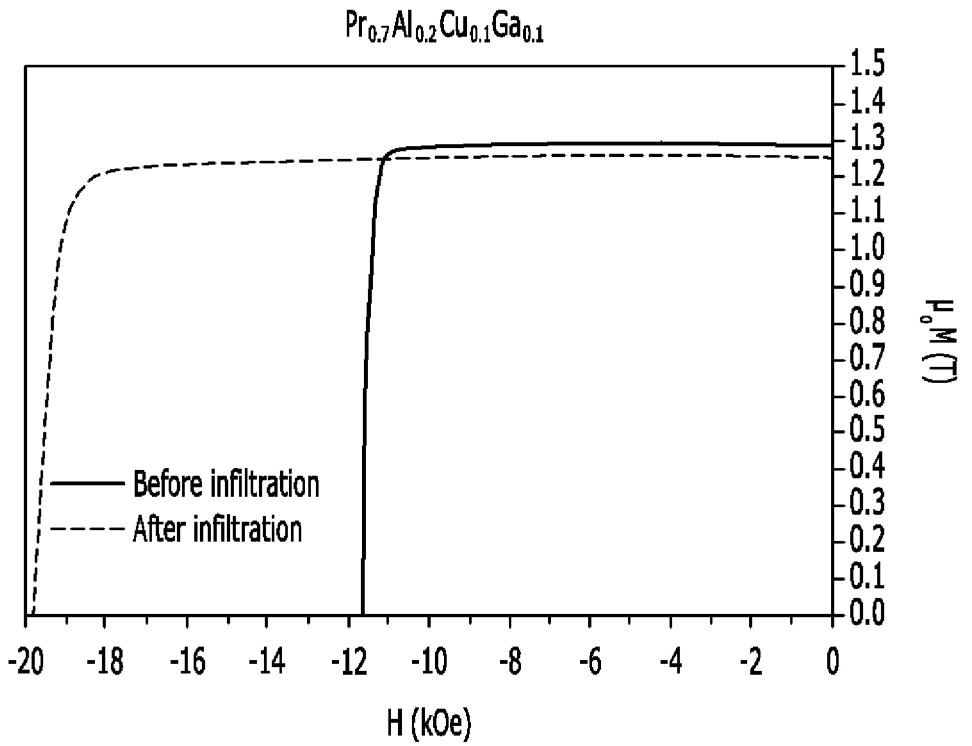
FIGS. 5 and 6 are graphs showing the magnetic flux density (Y-axis) according to the coercive force (X-axis) measured before and after using a quaternary metal alloy powder as the auxiliary agent for infiltrating the sintered magnet.
Figure 6:
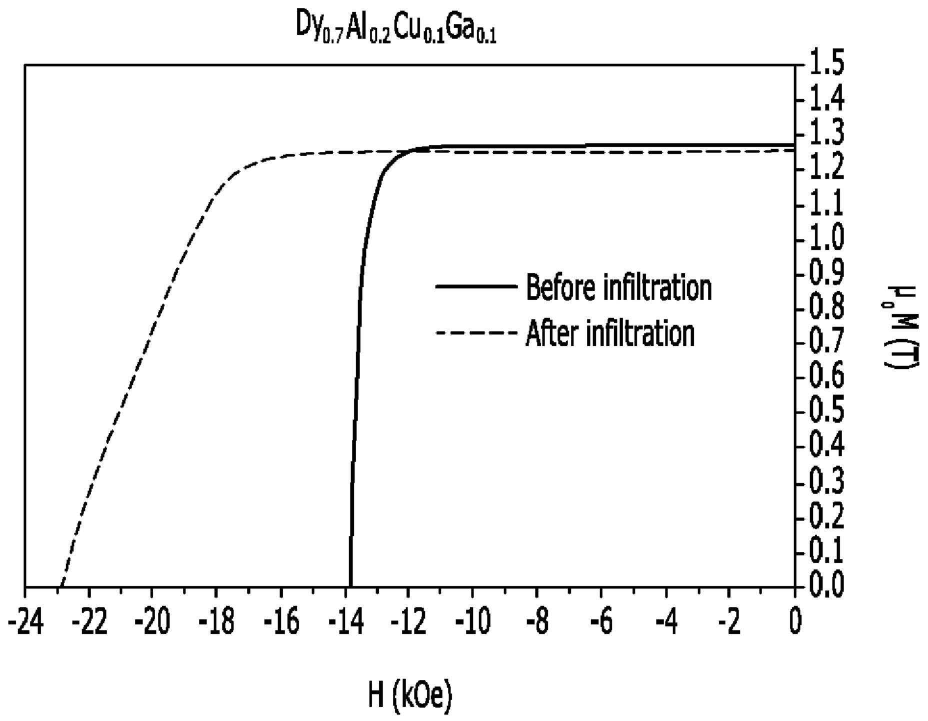

FIGS. 5 and 6 are graphs showing the magnetic flux density (Y-axis) according to the coercive force (X-axis) measured before and after using a quaternary metal alloy powder as the auxiliary agents for infiltrating the sintered magnet. In FIG. 5, in order to confirm the level of the coercive force for the magnet infiltrated using the metal alloy powder of $Pr_{0.7}Al_{0.2}Cu_{0.1}Ga_{0.1}$ of Example 7, in a state in which an alloy powder of 2 wt % of $Pr_{0.7}Al_{0.2}Cu_{0.1}Ga_{0.1}$ relative to the sintered magnet was attached to the sintered magnet, infiltration was performed at 900 degrees Celsius for about 10 hours under high vacuum, and post-heat treatment was performed at approximately 520 degrees Celsius, and the resulting coercive force before and after is shown. In FIG. 6, the coercive force level of the magnet infiltrated using the metal alloy powder of $Dy_{0.7}Al_{0.2}Cu_{0.1}Ga_{0.1}$ of Example 8 is shown.

Referring to FIGS. 5 and 6, it can be confirmed that the coercive force is improved when the quaternary metal alloy powder is used as an auxiliary agent for infiltration.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: crucible
200: tube furnace

The invention claimed is:

1. A method for producing a sintered magnet, comprising:
producing an R—Fe—B-based magnet powder by a reduction-diffusion method,
adding a R—Al—Cu powder as a sintering agent to the R—Fe—B-based magnet powder to form a mixed powder, wherein the R—Al—Cu powder is an alloy of R, Al and Cu, and R is Nd, Pr, Dy, Tb or Ce,
sintering the mixed powder to form a sintered magnet, and
forming the R—Al—Cu powder as the sintering agent,
wherein the forming the R—Al—Cu powder comprises:
mixing $RH_2$ powder, Al powder, and Cu powder to form a sintered precursor,
agglomerating the sintered precursor,
raising a temperature of the agglomerated sintered precursor to form a metal alloy, and
pulverizing the metal alloy to form the sintering agent.

2. The method according to claim 1, further comprising wrapping the agglomerated sintered precursor in a metal foil when raising the temperature of the agglomerated sintered precursor.

3. The method according to claim 2,
wherein the metal foil is Mo or Ta.

4. The method according to claim 2,
wherein when wrapping the agglomerated sintered precursor in the metal foil and raising the temperature, the temperature is raised in an argon gas atmosphere.

5. The method according to claim 1,
wherein the forming the sintered precursor further comprises mixing a liquid Ga.

6. The method according to claim 1, wherein the forming the metal alloy further comprises:
wrapping the agglomerated sintered precursor in a metal foil, raising the temperature up to 900 degrees Celsius to 1050 degrees Celsius, and then performing an additional heat treatment.

7. The method according to claim 1, wherein the agglomerating the sintered precursor uses any one of hydraulic pressing, tapping, or cold isostatic pressing (CIP).

8. The method according to claim 1, further comprising:
adding a $NdH_2$ powder to the R—Al—Cu powder as the sintering agent.

* * * * *